United States Patent
Shipley

(12) 
(10) Patent No.: US 6,260,580 B1
(45) Date of Patent: Jul. 17, 2001

(54) WATER DISTRIBUTION DEVICE FOR THAWING FROZEN FOODS

(76) Inventor: Kenneth B Shipley, R.D. 1, Box 193, Greensboro, PA (US) 15338

(*) Notice: Subject to any disclaimer, the term of this patent is extended or adjusted under 35 U.S.C. 154(b) by 0 days.

(21) Appl. No.: 09/544,857

(22) Filed: Apr. 7, 2000

Related U.S. Application Data

(60) Provisional application No. 60/128,343, filed on Apr. 8, 1999.

(51) Int. Cl.$^7$ .................................................. F16K 11/22
(52) U.S. Cl. ................................. 137/883; 426/524
(58) Field of Search ..................... 137/883, 560; 426/524

(56) References Cited

U.S. PATENT DOCUMENTS

| | | | |
|---|---|---|---|
| 2,231,886 | * | 2/1941 | Crider ................................... 426/524 |
| 2,598,961 | * | 6/1952 | Andrus .................................. 137/883 |
| 4,804,012 | * | 2/1989 | Goldman et al. ..................... 137/343 |
| 5,665,412 | * | 9/1997 | Fuller et al. .......................... 426/524 |
| 6,089,263 | * | 7/2000 | Dumser ................................. 137/552 |

* cited by examiner

*Primary Examiner*—John Fox
(74) *Attorney, Agent, or Firm*—Reising, Ethington, Barnes, Kisselle, Learman & McCulloch, P.C.

(57) ABSTRACT

A water distribution device for use in thawing multiple containers of frozen food. The device includes a coupling, siphon breaker, manifold, in-line thermometer, and a number of valves and associated supply tubes. The coupling is used to connect the device to a standard threaded faucet spout. The manifold supplies the water to each supply tube via one of the valves. The supply tubes can be run into the different containers to thereby permit multiple containers to be filled with water simultaneously. The valves permit individual control of the water flow to each container and can be used to prevent water flow through one or more of the supply tubes if they are not needed. The siphon breaker prevents backflow of water and the thermometer can be used to set and monitor the temperature of the water delivered to the containers.

12 Claims, 1 Drawing Sheet

WATER DISTRIBUTION DEVICE FOR THAWING FROZEN FOODS

This Application claims benefit of U.S. Provisional Application No. 60/128,343 filed Apr. 8, 1999.

FIELD OF THE INVENTION

The present invention relates to a water distribution device for thawing frozen foods.

DESCRIPTION OF THE PRIOR ART

It is often necessary in the food service industry to thaw frozen food. Commercially frozen food is typically transported and stored in sealed containers, such as plastic bags. The thawing of this food usually involves placing the sealed bags into an open-top thawing container, filling the container with water, and then maintaining a flow of running water into the container to slowly and evenly thaw the frozen contents of the plastic bags. Often, due to the amount of frozen food requiring thawing, more than one container may be needed, necessitating the use of multiple faucets simultaneously.

SUMMARY OF THE INVENTION

According to the present invention, there is provided a liquid distribution device particularly adapted to be used to simultaneously thaw multiple containers of frozen food. The device comprises a liquid inlet and a manifold in fluid communication with the liquid inlet. A vent is operatively associated with the manifold. The device further includes a plurality of supply branches in fluid communication with the manifold. Each of the supply branches has a valve thereon for regulating the flow of liquid through the associated of the supply branches.

Accordingly, it is a primary object of the present invention to provide a liquid distribution device that is capable of being used to thaw multiple frozen food containers simultaneously.

It is another object of the present invention to provide a device that allows for monitoring of the temperature of the liquid flowing therethrough.

It is another object of the present invention to provide a device that allows for independent control of several flow channels so that the flow channels can be selectively used to thaw frozen food containers.

BRIEF DESCRIPTION OF THE DRAWINGS

A preferred exemplary embodiment of the present invention will hereinafter be described in conjunction with the FIGURE, wherein.

DETAILED DESCRIPTION OF THE PREFERRED EMBODIMENT

Figure 1:
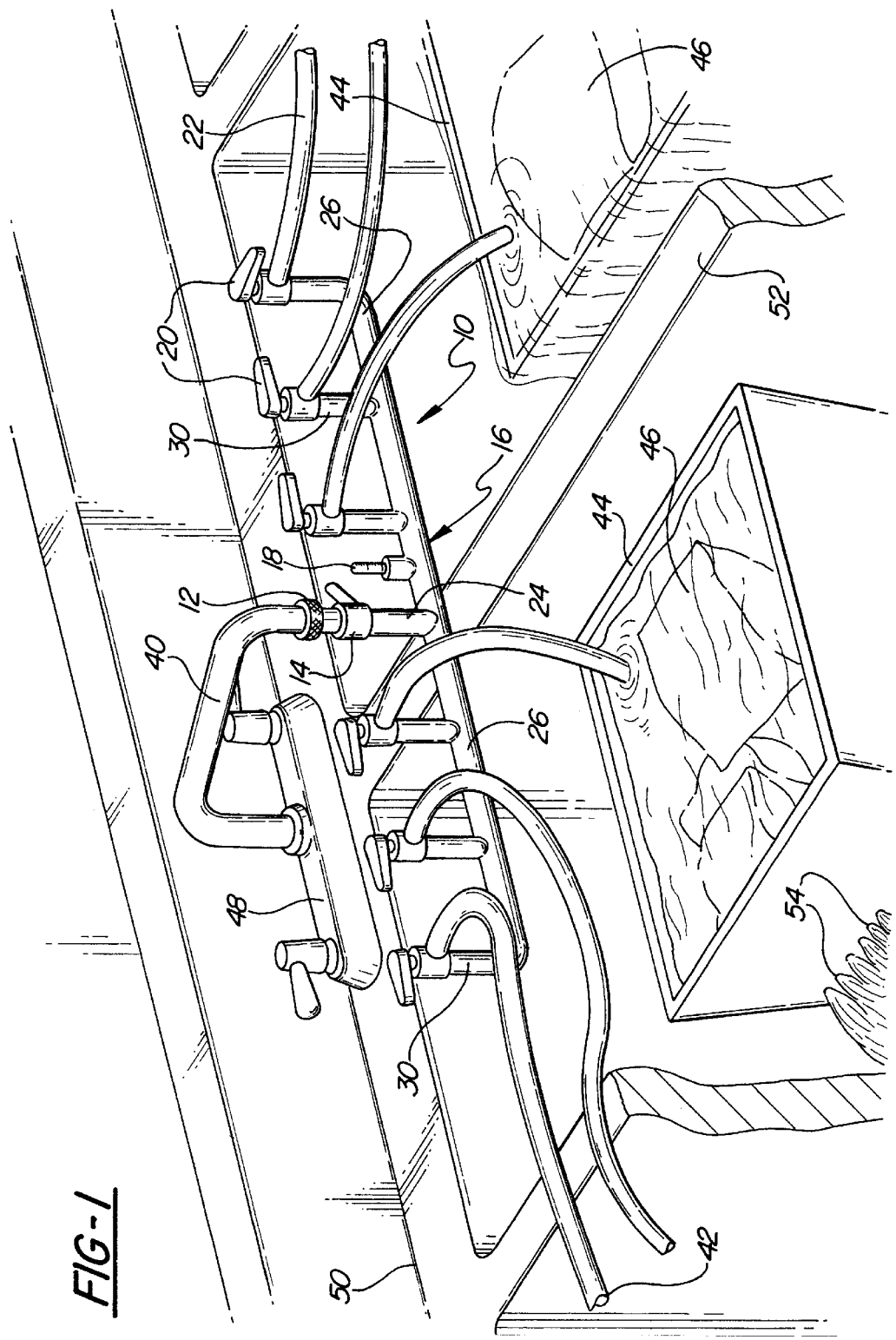
FIG. 1 is a perspective view of a preferred embodiment of a water distribution device of the present invention.

With reference to the FIGURE, there is shown a water distribution device 10 which includes a coupling or inlet 12, siphon breaker or vent 14, manifold 16, in-line thermometer 18, and a number of valves 20 and associated supply tubes 22. Coupling 12 is used to connect the device 10 to the threaded outlet of a spout of a standard commercial faucet 40. The coupling 12 has internal threads that allow it to be screwed over external threads on the outlet of the spout 40. The coupling 12 can be removable, and can be replaced with various sizes to accommodate a range of spout outlets. Of course, quick-release connectors and other well known arrangements could be used for connecting coupling 12 in the event that the spout is not threaded.

The coupling 12 is connected to siphon breaker 14, which is used to vent the manifold 16 to prevent a cross connection that could otherwise permit the backflow of contaminated water into the potable water supply lines that feed the faucet spout. Siphon breaker 14 is connected to manifold 16 which can be made of copper tubing or other suitable materials. All of the components can be made with from copper, or other suitable materials, such as plastics. It is, however, preferred that the supply tubes 22 be made of a flexible material such as plastic tubing.

Manifold 16 includes a central branch 24 which diverts water entering through the coupling into two separate channels 26. At this point, the water has been delivered to the two channels 26 without being impeded by a valve or similar device. Located in one of the channels 26 is the in-line thermometer 18 which can be used to monitor and control water temperature in accordance with NSF requirements, as well as any applicable local and state Health Department rules. Thermometer 18 extends upwardly from an in-line pipe fitting 28, which can be any of a number of commercially available pipe fittings that are designed for this purpose. Of course, it will be appreciated that other temperature measurement devices can be used in lieu of thermometer 18.

Extending from the two channels 26 are a number of supply branches 30, each of which terminates at a valve 20. These valved supply branches 30 can range in number from two to as many as can be handled by the volumetric flow capability of the water source. The figures enclosed show six separate valved supply branches 30. As shown, these supply branches 30 are oriented upwardly to direct the diverted water upward to the valves 20. At the outlet of each valve 20 is one of the flexible supply tubes 22 that has an open orifice 42 at its free end. The free end of each tube 22 can be placed inside of the thawing containers 44 and then used to deliver water at a rate controlled by the valves 20. As the water fills the thawing containers 44, it surrounds the sealed bags 46 of frozen food, and therefore thaws the food.

The connection of the central branch 24 and supply branches 30 to the channels 26 is by way of standard pipe fittings, such as T-connectors or elbow joints. The connections are made in the normal manner. Similarly, the vales 20 are connected to their respective supply branches 30 in any well known manner, such as threaded couplings, sweated joints or the use of adhesives. The supply tubes 22 are preferably threadedly connected to the valve 20. It will be appreciated, however, that any connection between the supply tubes 22 and valves 20 is within the scope of the present invention.

The water distribution device 10 of the present invention has many advantages over conventional methods of using thawing containers one at a time. Firstly, a single faucet 48 can be used to simultaneously fill and maintain running water through multiple containers 44. Secondly, the temperature of the water can be easily monitored and therefore more precisely controlled. Thirdly, the valves 20 provide a means for controlling the flow of water to each of the supply tubes 22. By adjusting the valves 20, the operator can control the rate of water flow to each supply tube. These valves also allow the operator to selectively use any number of containers 44 (up to the amount of supply tubes 22 on the manifold 16) by simply closing the valves 20 for the supply tubes 22 that they do not need. In addition, adjusting the valves 20 allows the operator to fill various sized thawing containers 44 by adjusting the water flow rate to each one. In this manner the operator can set up the system, turn the water on and then balance the flows as necessary.

As shown in the drawings, the containers 44 are placed in a conventional commercial sink 50. The sink may have a plurality of dividers 52 separating them into various compartments. Alternatively, many of the containers 44 can be contained within a single compartment in the sink 50. Water flows into the containers 44 around the bags 46. As show in the figure, the water can be drained from the container 44 through a series of orifices 54 located at the bottom portion of the containers 44. Alternatively, the water entering the container 44 through the supply tubes 22, may simply overflow the container 44 as shown in the figure. In this manner, water is flowing over the bags of frozen food 46 to thaw the food contained within bag 46.

It will thus be apparent that there has been provided in accordance with the present invention a water distribution device which achieves the aims and advantages specified herein. It will, of course, be understood that the foregoing description is of preferred exemplary embodiments of the invention and that the invention is not limited to the specific embodiment shown. Various changes and modifications will become apparent to those skilled in the art. For example, the thermometer 18 or other temperature sensor could be located within the central branch 24 so that the temperature of all water flowing through the device 10 can be measured, regardless of which or how many valves 20 are set in their open position. All such changes and modifications are intended to be within the scope of the present invention.

What is claimed is:

1. A liquid distribution device particularly adapted to be used to simultaneously thaw multiple containers of frozen food comprising:
   a liquid inlet;
   a manifold in fluid communication with said liquid inlet;
   a vent operatively associated with said manifold to vent said manifold to prevent back flow of water through said manifold; and
   a plurality of supply branches and fluid communication with said manifold, each of said supply branches having a valve thereon for regulating the flow of liquid through the associated of said supply branches.

2. A liquid distribution device as set forth in claim 1 further including a temperature monitor on one of said manifold and said supply branches.

3. A liquid distribution device as set forth in claim 2 wherein said temperature monitor comprises a thermometer connected to said manifold.

4. A liquid distribution device as set forth in claim 2 further including a flexible supply tube having first and second ends, said first end operatively associated with said valve, said second end being free and having an open orifice for allowing liquid to flow out of said flexible supply tube.

5. A liquid distribution device as set forth in claim 4 wherein said manifold comprises a central supply branch and a plurality of channels, said supply branches connected to said channels and extending therefrom.

6. A liquid distribution device as set forth in claim 5 wherein said supply branches extend from said channels and terminate at said valve.

7. A liquid distribution device as set forth in claim 6 wherein said supply branches, said central supply branch and said plurality of channels comprise copper tubing.

8. A liquid distribution device as set forth in claim 5 wherein said liquid inlet comprises a coupling for connection to a liquid spout.

9. A liquid distribution device as set forth in claim 8 wherein said coupling has threads thereon for connection with a threaded faucet spout.

10. A water distribution device particularly adapted to be used to simultaneously thaw multiple containers of frozen food comprising
   a coupling for connection to a threaded water spout;
   a manifold comprising a central supply branch connected at one end to said coupling and at a second end to a plurality of channels, supply branches connected to said channels; each of said supply branches terminating at a valve, and a flexible supply tube, said flexible supply tube having first and second ends, said first end operatively associated with said valve, said second end being free and having an open orifice for allowing liquid to flow out of said flexible supply tube;
   a temperature monitor connected to said manifold; and
   a vent connected to said manifold to prevent backflow of water through the device.

11. A device as set forth in claim 10 wherein said temperature monitor is a thermometer.

12. A device as set forth in claim 10 wherein said coupling is threaded.

* * * * *